( 12 ) United States Patent
Federighi et al.

(10) Patent No.: US 8,484,095 B1
(45) Date of Patent: Jul. 9, 2013

(54) SUPPLIER APPROVAL AND ACTIVATION IN A SUPPLIER NETWORK

(75) Inventors: Craig Michael Federighi, Los Altos Hills, CA (US); Mohak Shroff, Fremont, CA (US); Aarathi Vidyasagar, Cupertino, CA (US)

(73) Assignee: Ariba, Inc., Sunnyvale, CA (US)

( * ) Notice: Subject to any disclaimer, the term of this patent is extended or adjusted under 35 U.S.C. 154(b) by 1265 days.

(21) Appl. No.: 12/004,081

(22) Filed: Dec. 18, 2007

Related U.S. Application Data

(60) Provisional application No. 60/876,752, filed on Dec. 21, 2006.

(51) Int. Cl.
*G06Q 30/00* (2006.01)
(52) U.S. Cl.
USPC ............... 705/26.4; 705/26.81; 705/26.1
(58) Field of Classification Search
USPC ............... 705/26, 26.1, 26.4, 26.81, 27, 27.1
See application file for complete search history.

(56) References Cited

U.S. PATENT DOCUMENTS

| | | | | |
|---|---|---|---|---|
| 5,765,138 A | * | 6/1998 | Aycock et al. | 705/7 |
| 2002/0010524 A1 | * | 1/2002 | Jin et al. | 700/106 |
| 2002/0087368 A1 | * | 7/2002 | Jin et al. | 705/7 |
| 2002/0087372 A1 | * | 7/2002 | Maresca et al. | 705/7 |
| 2003/0200168 A1 | * | 10/2003 | Cullen et al. | 705/37 |
| 2003/0212604 A1 | * | 11/2003 | Cullen, III | 705/26 |
| 2006/0095314 A1 | * | 5/2006 | Wu et al. | 705/10 |

* cited by examiner

*Primary Examiner* — Amee A Shah
(74) *Attorney, Agent, or Firm* — Van Pelt, Yi & James LLP

(57) ABSTRACT

A supplier for commerce is approved of. In the event activity in a buyer operated application occurs, authorization of the supplier is initiated. Via a supplier network, information about the supplier with respect to a buyer is received. The received information includes a structured commerce profile for the supplier. The received information is made available to the buyer to make a decision regarding whether to approve of the supplier. The decision is received from the buyer. In the event the received decision is to approve of the supplier, an indication associated with adding the supplier to an approved supplier list in a buyer operated application is sent.

20 Claims, 8 Drawing Sheets

SUPPLIER APPROVAL AND ACTIVATION IN A SUPPLIER NETWORK

CROSS REFERENCE TO OTHER APPLICATIONS

This application claims priority to U.S. Provisional Patent Application No. 60/876,752 entitled SUPPLIER ACTIVATION IN A SUPPLIER NETWORK filed Dec. 21, 2006 which is incorporated herein by reference for all purposes.

BACKGROUND OF THE INVENTION

For many companies, the process of approving new suppliers (also referred to as supplier activation) is a manual and/or time consuming process. For example, some companies have a supplier manager who is responsible for approving new suppliers. The supplier manager may call the supplier getting approved, ask to be connected to the proper person, inform the person of the buying company's requirements for its suppliers to become approved, wait for the requested information to be provided, and review the information. Sometimes this takes many follow up phone calls on the part of the supplier manager. For large companies that review thousands of new suppliers every month, the amount of work required may correspondingly increase. It would be useful if new techniques associated with supplier activation were developed.

BRIEF DESCRIPTION OF THE DRAWINGS

Various embodiments of the invention are disclosed in the following detailed description and the accompanying drawings.

DETAILED DESCRIPTION

The invention can be implemented in numerous ways, including as a process, an apparatus, a system, a composition of matter, a computer readable medium such as a computer readable storage medium or a computer network wherein program instructions are sent over optical or communication links. In this specification, these implementations, or any other form that the invention may take, may be referred to as techniques. A component such as a processor or a memory described as being configured to perform a task includes both a general component that is temporarily configured to perform the task at a given time or a specific component that is manufactured to perform the task. In general, the order of the steps of disclosed processes may be altered within the scope of the invention.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Figure 1:
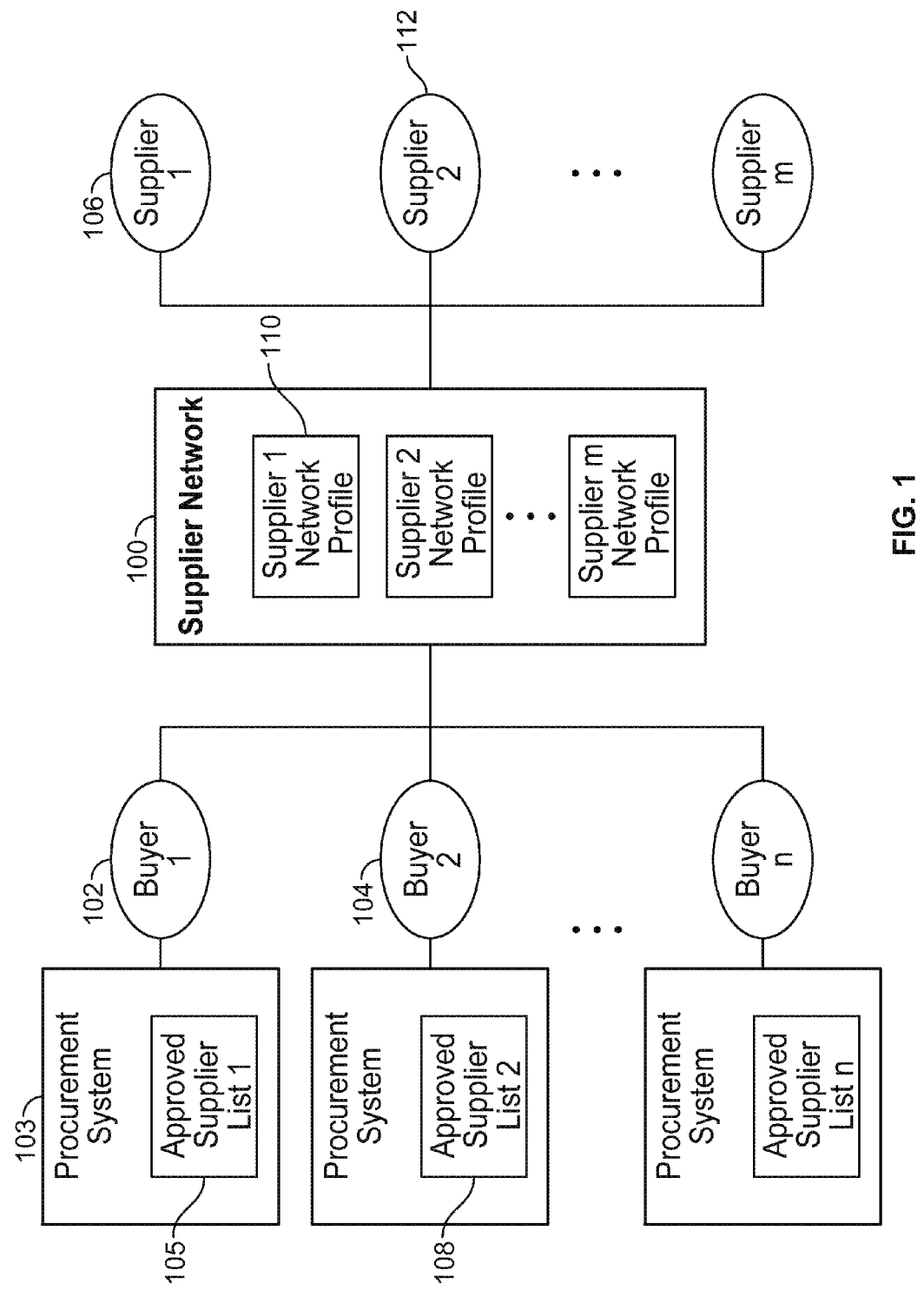
FIG. 1 is a system diagram illustrating an embodiment of a supplier network used in supplier activation.

FIG. 1 is a system diagram illustrating an embodiment of a supplier network used in supplier activation. In the example shown, multiple buyers and multiple suppliers are associated with supplier network 100. In some cases, a given buyer is a large enterprise and has thousands or tens of thousands of suppliers. Similarly, a given supplier in some cases provides goods or services to a relatively large number of buyers. In one example of how supplier network 100 is used, an employee at buyer 1 (102) wants to purchase a good or service from supplier 1 (106). The employee may use procurement system 103 coupled to buyer 1 (102) and determine that supplier 1 (106) is an approved supplier and is included in approved supplier list 1 (105). A purchase order is passed to supplier network 100. Supplier 1 network profile 110 is determined to correspond to supplier 1 (106) and routing information stored in the supplier network profile is accessed. Using this routing information, the purchase order is routed or otherwise passed to supplier 1 (106). In some embodiments, information associated with some other transaction, activity, or event is exchanged. For example, supplier network 100 may receive a Request for Information (RFI) or a Request for Proposal (RFP) from a given buyer and the document or related information is routed to one or more suppliers coupled to supplier network 100.

A supplier network profile is one example of a structured commerce profile; in some embodiments, a structured commerce profile has some other form, contents, etc. compared to the example shown herein. In various embodiments, a supplier network profile contains information to identify who a suppler is, whether that supplier can fulfill a particular need, and/or whether that supplier meets a buyer's standards sufficiently to actually transact with that supplier. Some particular examples of the information contained in a supplier network profile include: Identification information (e.g., identifiers such as a Data Universal Numbering System (DUNS) ID or Ariba Supplier Network (ANID)), an organizational profile, contact information (e.g., headquarters address, telephone number, email, web site addresses, etc.), number of employees, revenue, credit rating, special statuses (e.g., women owned, minority owned, veteran owned, etc.), capability information, commodity related information (e.g., commodities supplied, commodity-specific capability sub-profiles, product catalogs, etc.), regions supplied, quality and safety certifications, payment information, bill-to address, banking account numbers for ACH transactions, eCommerce routing information, EDI, cXML or other protocols supported, and/or URLs/addresses for transactions.

In the example shown, each buyer is associated with an approved supplier list stored in its respective procurement system. In the examples described herein, employees of a buyer are not permitted to make purchases or perform certain interactions with unapproved suppliers (i.e., suppliers that are not included in an approved supplier list). For example, some buyers perform checks to verify that a supplier is legitimate, financially stable, or reputable before approving of the supplier. Some buyers require a supplier to agree to certain terms or conditions, for example associated with delivery, payment/reconciliation, supplying a product or service exclusively, non-disclosure agreements, etc. Some buyers require a supplier to provide certification, insurance/bond information, licenses, compliance documentation, registration numbers, etc. In some cases, one buyer has a different set of checks or requirements to approve a vendor compared to another buyer.

As used herein, a new supplier refers to a supplier that is not approved or authorized with respect to a particular buyer. In some cases, a given supplier is approved with respect to one buyer but not another buyer. For example, supplier 2 (112) may be approved by buyer 2 (104) and is thus included in approved supplier list 2 (108). However, buyer 1 (102) may not yet have approved of supplier 2 (112) and approved supplier list 1 (105) does not include supplier 2 (112). In this example, supplier 2 (112) is a new supplier with respect to buyer 1 (102) but not with respect to buyer 2 (104).

What is disclosed is using a supplier network to perform at least some operations associated with supplier activation. Supplier activation refers to approving of or authorizing a particular supplier with respect to a particular buyer. In some embodiments, a supplier network determines a particular buyer's requirements, obtains appropriate information from a new supplier, sends reminders to a supplier if information is not provided within a certain amount of time, notifies a buyer that information about the new supplier has been obtained, and/or makes information available for review.

In some cases, using a supplier network to perform operations associated with supplier activation is attractive or desirable. For example, information stored or managed by a supplier network may be leveraged or reused during supplier activation, in some cases reducing the amount of time to obtain appropriate information. In some cases, the amount of manual effort on the part of employees at the buyer is reduced. For example, rather than repeatedly asking a new supplier to provide a complete set of information about itself for each buyer, in some embodiments information stored by a supplier network is presented to the buyer during a supplier activation process. This may reduce the amount of work on the part of an employee at the new supplier.

On the buyer side, the responsibility of obtaining information about the new supplier in some embodiments is offloaded to a supplier network. For example, a supplier manager at a buyer may no longer have to call new buyers, remind them to provide information, etc. In some embodiments, an email is sent by a supplier network to a new supplier that notifies or invites the supplier to provide information (e.g., via a website) used in an approval process. In some embodiments, a supplier network is configured to accept paper and/or manual responses (e.g., faxing information, calling a call center, etc.) should a supplier optionally decide to respond in such a manner. In some embodiments, a supplier manager at a buyer only becomes involved when an appropriate collection of information about the new supplier has been gathered.

In some embodiments, organic supplier activation is performed, where supplier activation is triggered by some activity or event associated with a new supplier in a buyer operated application. Some examples include a requisition, a purchase, an RFI, an RFQ, etc. In some embodiments, organic supplier activation uses a requisition to trigger or initiate supplier activation for that new supplier. For example, an employee at a buyer may be permitted to create a requisition even if a supplier associated with the requisition has not yet been approved. In some embodiments, supplier activation is not performed for a new supplier unless some triggering or initiating event or activity occurs, such as a requisition. In some embodiments, some other event or activity besides a requisition is used.

In some embodiments, at least some processing is performed on a buyer's side (e.g., at a procurement system coupled to or associated with a buyer) in parallel with or while supplier activation is being performed. For example, suppose that buyer 1 (102) is in the process of approving of supplier 2 (112). While supplier activation related processing is being performed by supplier network 100 (e.g., collecting appropriate information from supplier 2 (112) to be reviewed by buyer 1 (102)), in some embodiments a limited or partial set of processing or privileges is permitted at procurement system 103 or other component associated with buyer 1 (102). For example, there may be a requisition associated with supplier 2 (112) at procurement system 103; while supplier activation related operations are being performed by supplier network 100, the requisition may go through an approval process at procurement system 103. By not requiring supplier activation to be completed before at least some processing is performed on the buyer side, the amount of overall time spent may be reduced. In some scenarios this is desirable. For example, if a requisition needs to be satisfied quickly, it may be desirable to begin an approval process at a procurement system or buyer side while the new supplier is getting approved. In some embodiments, some other processing besides approval of a requisition is performed at a procurement system or other device associated with a buyer in parallel with supplier activation.

In some embodiments, organic supplier activation and permitting at least some processing to be performed on a buyer side in parallel with supplier activation are independent of each other. For example, in some embodiments, organic supplier activation is performed, but parallel processing at a buyer side is not permitted. In some embodiments, organic supplier activation is performed and at least some processing is permitted at a buyer side while supplier activation is performed.

In this example, each buyer has its own procurement system and each approved supplier list is maintained and/or stored on an associated procurement system. In some embodiments, a procurement system includes or is associated with Enterprise Resource Planning (ERP) and/or is a product from SAP, ORACLE, or PEOPLESOFT. In some embodiments, an employee at a buyer uses a procurement system to make a purchase or perform some other business process. For example, an employee at buyer 1 (102) may access procurement system 103. The employee may be presented with and/or be able to search through approved suppliers (e.g., obtained from an approved supplier list) and be able to create and distribute a procurement document, an RFI, an RFP, or a purchase order. In some embodiments, a business related document or information is then passed to supplier network 100 where it is routed or otherwise communicated to appropriate supplier(s) coupled to supplier network 100.

In various embodiments, supplier network 100 has a variety of operations, features, and/or functions associated with it. For example, some supplier networks route a purchase order from a buyer to a supplier using electronic or digital storage or communication techniques. As such, information such as channel, mapping and/or routing information used to properly handle and forward a purchase order is stored and maintained by a supplier network as needed in various embodiments. In this example, for each supplier associated with supplier network 100 there is a supplier network profile maintained and/or stored at supplier network 100. In some embodiments, channel, mapping, and/or routing information is stored in an appropriate supplier network profile. In some embodiments, supplier network 100 comprises multiple physical and/or logical components, for example to store, manage, audit, track, search, and/or communicate documents, events, or information.

In some embodiments, supplier network 100 stores or has a profile or account (not shown) for each buyer associated with the supplier network. For example, in some embodiments, such a profile is used to store each buyer's requirements that are associated with supplier activation. A supplier network may use stored requirements to determine what information to obtain from a supplier. This may be desirable in some applications since requirements may not change that frequently and a buyer does not need to pass its requirements to supplier network 100 each time a new supplier gets approved. In some embodiments, a buyer is able to update its requirements that are stored at supplier network 100.

In some embodiments, supplier enablement is performed in addition to supplier activation. Supplier enablement refers to the process of joining or becoming associated with a supplier network. For example, in some cases a new supplier is not part of or associated with supplier network 100. A supplier may be a new company and may not yet have created a supplier network profile or account on supplier network 100. In some embodiments, some other task or action (e.g., in addition to or as an alternative to creating a supplier network profile) is associated with joining a supplier network. For example, some supplier networks require a supplier to agree to terms/conditions and/or agree to pay a fee to an administrator of a supplier network (e.g., Ariba®) before a supplier is permitted to join a supplier network. In some embodiments, supplier enablement is triggered by or overlaps with supplier activation. In some embodiments, supplier enablement is not performed. For example, if supplier 2 (112) is getting approved, supplier enablement would not be performed for it because supplier 2 (112) is already associated with supplier network 100.

In various embodiments, supplier network 100 communicates with buyers and/or suppliers that are coupled to it using various communication techniques or channels. Some examples of how a supplier receives information include via fax, email, Electronic Data Interchange (EDI), Commerce XML (CXML), etc. A variety of platforms, interfaces and/or devices can be included in supplier network 100. In various embodiments, various techniques for sending a document or other information (e.g., to a supplier) are used. In some configurations, information is pushed to a supplier, for example by fax or email. In some configurations, a supplier can retrieve or otherwise pull information when so desired. For example, a user associated with a supplier may go to a particular website or run an application and check for any new documents or information.

A variety of networks and/or communication protocols can be used in a system that includes a supplier network. Some example techniques or technologies include Internet/web based, wireless networks (such as mobile telephone networks, satellite networks, and wireless broadband networks), and/or wired networks (such as telephone connections, T1 connections, etc.). In some cases, different suppliers or buyers use different techniques to communicate with or access a supplier network.

In some embodiments, supplier network 100 includes multiple devices or components that are physically separate or distinct from each other. In various embodiments, supplier network 100 includes storage components, processing components, networking/communication components, etc. For example, in some configurations, a buyer or supplier is able to communicate via an Internet or web interface and supplier network 100 includes web servers or other devices. In some embodiments, supplier network 100 includes storage components and purchase orders received by supplier network 100 are stored. In some embodiments, purchase or other business process related information can be searched, manipulated, and/or processed and supplier network 100 includes processing components for creating reports, searching, auditing, identifying open purchase orders, etc.

In some embodiments, a system is architected or organized in some other manner than the examples described herein. For example, in some embodiments, a single buyer hosts a private portal and enables its suppliers via this portal only. For example, some supplier networks are associated with a single buyer and each buyer has its own private portal. In some embodiments, an approved supplier list is obtained from or managed by some other system besides a procurement system. In some embodiments, there is a client/local device or entity associated with each buyer and/or each supplier. For example a local device or a client device may be configured to communicate with supplier network 100, store information used by supplier network 100, or perform other functions as appropriate.

Figure 2A:
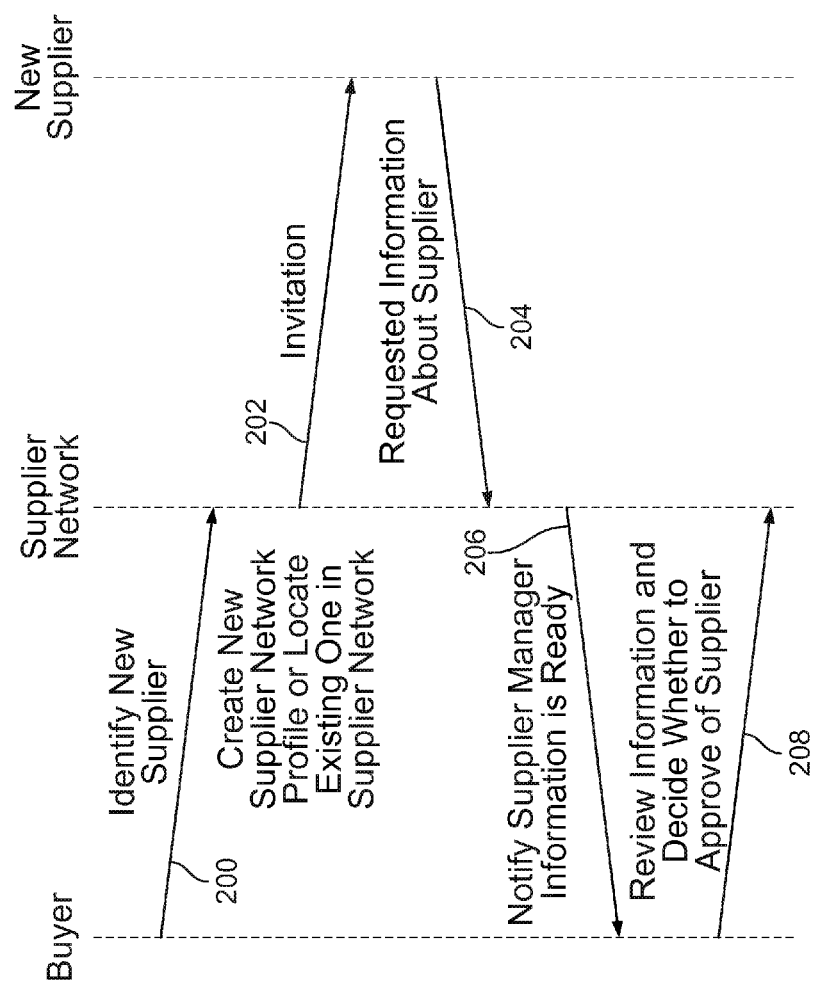
FIG. 2A is a diagram illustrating an embodiment of information exchanged during supplier activation.

FIG. 2A is a diagram illustrating an embodiment of information exchanged during supplier activation. In the example shown, supplier activation is offloaded to a supplier network where automated processes are used to obtain information about the new supplier and/or manage the process of obtaining information.

Identification of a new supplier is passed from a buyer to a supplier network at 200. In various embodiments, various pieces of information are sent. For example, the name of the supplier, the name of a contact person, and/or contact information (e.g., an email address, URL, telephone number, fax number, address, etc.) can be included at 200. In some embodiments, there is some minimum or required set of information about a new supplier that is passed from a buyer to a supplier network at 200. For example, some systems require buyers to provide an email address of a contact person at the supplier. In some embodiments, an email invitation is sent to the email address and the invitation includes (for example) instructions, a URL, a link, and/or portal via which the new supplier is able to provide information used in supplier activation to the supplier network.

In various embodiments, a given buyer's requirements or other information used in supplier activation is obtained by a supplier network in a variety of ways. In some embodiments, a buyer provides this information to a supplier network ahead of time and this information is stored at a supplier network until needed. For example, a supplier network may have a profile or account in which it stores information (e.g., supplier activation requirements) about each buyer associated with the supplier network. Alternatively, in other embodiments, a buyer's requirements are not stored at a supplier network and a buyer passes its requirements to a supplier network each time supplier activation is performed.

A new supplier network profile is created or an existing one is located in a supplier network. In some cases, a new supplier is already part of or associated with a supplier network and there exists a supplier network profile for that supplier. In other cases, a new supplier is not associated with a supplier network and a new supplier network profile is created. In some embodiments, a supplier network profile is an account or other object that is used to store and/or manage an appropriate collection of information for an associated supplier. For example, each supplier may specify portal or routing information (e.g., how they want to receive information or documents: by fax, send all content in email, notified by email and retrieve from website, etc.). In some embodiments this information is stored in a supplier network profile.

In some embodiments, a supplier network profile is used to communicate to a new supplier what information is needed, is used to store information provided by a new supplier, and is accessed by or presented to a buyer after appropriate information is obtained. For example, a supplier network profile may include fields with appropriate labels that correspond to a given buyer's requirements for supplier activation. For example, a field labeled, "California contractor's license number" may be included in a supplier network profile if a buyer requires its supplier to have a contractor's license in the state of California. In some cases, a buyer may require its suppliers to be bonded and/or insured and field(s) associated with bond/insurance information is included in a supplier network profile. Other fields associated with requirements, terms, conditions, certification, may be included as appropriate. In some embodiments, new fields are added to an existing supplier network profile only for those fields that were not already included. For example, a supplier may have been approved with respect to one buyer and some information required by a second buyer may already have been provided.

An invitation is sent from a supplier network to a new supplier at 202. In some embodiments, an invitation's contents vary depending upon a variety of factors including (for example) whether an existing supplier network profile is found (i.e., the new supplier is already part of or associated with the supplier network), what information an existing supplier network profile contains, and/or the criteria or requirements a particular buyer has to approve of a new supplier. In some embodiments, an invitation includes an introduction and explanation of a supplier network if a new supplier is not already part of a supplier network. A supplier may, for example, be unfamiliar with the features and capabilities of supplier networks and an explanation may be useful.

At 204, requested information about a supplier is passed from a new supplier to a supplier network. In this example, fields in a supplier network profile are filled with the requested information. In some embodiments, an invitation sent at 202 includes a link to a website via which a supplier network profile is accessed. In some embodiments, some other technique is used (e.g., in addition to or as an alternative to a website) to access a supplier network profile and provide requested information. For example, in some embodiments a new supplier is able to call a call center or mail in a completed form with the requested information.

In some examples described herein, a user at a new supplier fills in fields or otherwise provides requested information manually (e.g., by typing responses in to a webpage). In some cases, a user at a new supplier only wants to do this once. In some embodiments, a user at a supplier completes or fills in a supplier network profile of its own initiative or without being asked, for example in anticipation of a first or subsequent supplier activation process. In some cases, all information believed to be pertinent or of interest is provided, for example so that a user at a new supplier is not bothered as more buyers approve of a particular supplier. In some embodiments, information about a new supplier is obtained automatically by querying or interfacing with an appropriate system or device. In some embodiments, information is stored in a repository at the supplier and this repository is searched or queried without requiring manual interaction or direction.

A supplier manager is notified that information is ready at 206. In some embodiments, a supplier manager is a person who has the authority to approve of new suppliers. In some embodiments, a check is performed to ensure that certain minimum fields are completed before a supplier manager is notified. This may, for example, reduce the likelihood of an application that is only partially completed. At 208, information is reviewed and a decision is made whether to approve of a supplier. In some embodiments, information is stored in a supplier network profile which is accessible via the Internet. In some embodiments, a supplier manager is able to make a variety of decisions (e.g., approved, not approved, need more information, correction required, etc.) and informs a supplier network accordingly of her decision. Appropriate action may be triggered based on a supplier manager's decision (e.g., a supplier network notifies a supplier more or corrected information is needed, notifies a procurement system that a new supplier has been approved, etc.). In some embodiments, reviewing information and making a decision at step 208 is performed automatically. For example, a process may compare information provided by a new supplier against a buyer's requirements or conditions for approving suppliers.

In some applications, performing supplier activation in a supplier network environment offers a number of advantages because capabilities, features, and/or operations associated with a supplier network make supplier activation easier as conditions change or as time goes on. For example, a grocery store chain may want to add a new requirement to make its produce suppliers (including approved suppliers) grow their products organically. In some embodiments, a buyer indicates to a supplier network that it has a new requirement for its suppliers (e.g., by updating requirements stored at a supplier network). In some embodiments, new invitations are sent to all suppliers for that buyer, indicating that a new requirement is in place and asking the suppliers to provide the requested information or agree to the new conditions/terms. In other systems that do not use supplier networks, implementing new policies or requirements may be a time consuming task.

In some applications, using a supplier network to perform supplier activation is desirable in cases where information provided by a supplier becomes stale or out of date. In some embodiments, a supplier network is configured to periodically send invitations to suppliers to ensure that fresh or up to date information is provided. For example, once a year each supplier may be invited to update its supplier network profile. In some embodiments, using a supplier network is convenient since a given supplier only needs to update a single account, rather than updating different, private portals or accounts for each buyer that it deals with. In some embodiments, new information is compared against old information. For example, some systems are configured to provide a supplier manager with a summary of the comparison (e.g., a message saying, "Misty Valley Farms has updated its account and none of the information has changed. We recommend that this supplier be re-approved for the coming year."). In some cases, information that has changed is flagged, for example, to a supplier manager (e.g., a message saying, "Misty Valley Farms has updated its account. We noticed that some of their responses have changed and recommend that you review the updated information."). In some embodiments, a supplier has the option of updating a supplier network profile on its own (e.g., without an invitation). For example, a supplier may update its supplier network profile after a change in ownership.

In some embodiments, a system is implemented in some other manner. For example, in the figure described above, a supplier manager accesses a supplier network profile at a supplier network and views the information stored there. Alternatively, in some embodiments, information stored in a supplier network profile is downloaded, for example to a procurement system. In such embodiments, the supplier manager may access the procurement system and review the downloaded information in making his/her decision. In some embodiments, information about a new supplier is pushed, for example directly to a supplier manager in the body of an email. A variety of systems and/or methods may be used to perform the concepts described herein.

In some embodiments, once a new supplier has been approved, a process at a procurement system is resumed or is permitted to begin. For example, some systems are configured so that a business related event or action is not able to be performed until a new supplier has been approved. Alternatively, in some embodiments, at least partial processing is permitted to be performed while a new supplier is being approved. For example, in some embodiments, a requisition or other business related document is able to go through an approval process (e.g., getting approved by the manager of the person who created the requisition) in parallel with supplier activation. The following figure illustrates one such embodiment.

Figure 2B:
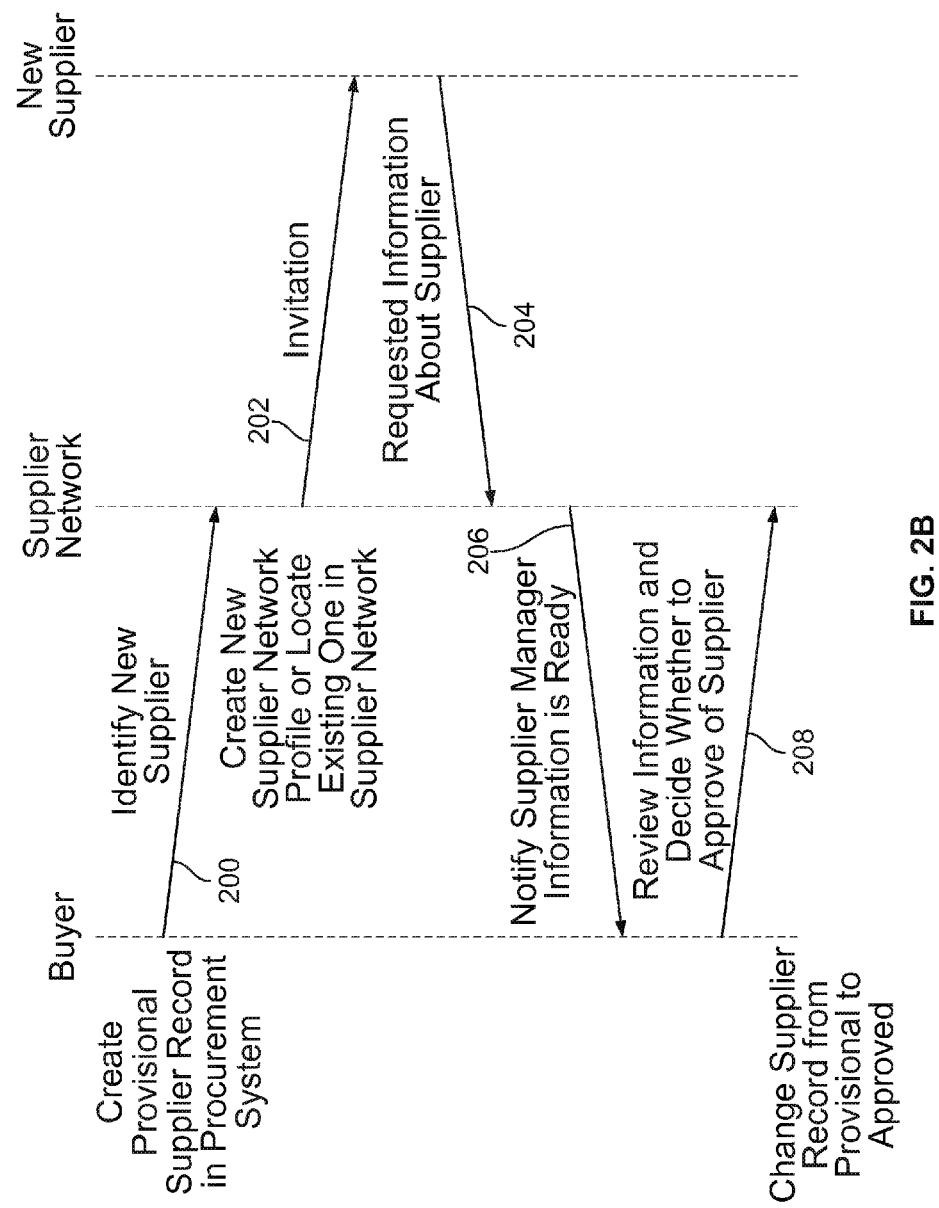
FIG. 2B is a diagram illustrating an embodiment in which a provisional supplier record is created and optionally operated on in a procurement system while a supplier network performs supplier activation related processing.

FIG. 2B is a diagram illustrating an embodiment in which a provisional supplier record is created and optionally operated on in a procurement system while a supplier network performs supplier activation related processing. In the example shown, the same exchange of information is shown as in FIG. 2A. However, in this example, a provisional supplier account is created at a procurement system.

In the example shown, a provisional supplier record is created in a procurement system associated with the buyer that is approving of a new supplier. In this example, a provisional supplier record is an object or piece of data used to store information associated with a new supplier (e.g., which a supplier network is obtaining information about) and is managed by and/or operated on by a procurement system. In the example shown, the time at which a provisional supplier record is created is not necessarily related or tied to exchange of an invitation at 200. For example, a provisional supplier record may be created at procurement system before or after identifying a new supplier at 200.

In some embodiments, a provisional supplier record has a reduced set of privileges or operations associated with it so that at least some processing is able to be performed while the new supplier is getting approved. For example, some systems are configured so that a new supplier with a provisional supplier record is able to be included in or linked to a requisition, RFI, or RFP, but is not permitted to be included or linked to a purchase order. In this example, once a supplier manager has reviewed appropriate information and approved of the supplier at 208, the provisional supplier record is changed from a provisional status to an approved status. In some embodiments, once a provisional supplier record goes to an approved state, a full set of privileges or operations are permitted.

In one example, a user at a buyer wants to create a requisition. However, the desired supplier is a new supplier and must be approved. In some embodiments, a provisional supplier record is created in the procurement system and is linked to the newly created requisition. In this example, the requisition can be processed within or by a procurement system while the supplier network obtains appropriate information used in supplier activation. For example, the user may complete the requisition by providing the requested good/service, quantity, etc. The completed requisition may be reviewed by the user's manager, for example, via the procurement system. In some embodiments, if a requisition is approved on a buyer side before supplier activation is completed, the requisition is held back until the new supplier is approved.

In some cases, performing at least some processing at a procurement system or at a buyer while waiting for supplier activation to be performed is desirable. For example, time may be saved since requisition approval (or some other process) does not need to wait for the supplier activation process to be completed.

In some embodiments, a provisional supplier record is part of or associated with an approved supplier list. For example, a provisional supplier record may be a new entry in an approved supplier list. In some embodiments, new fields are added as appropriate to an approved supplier list to distinguish between approved suppliers and new suppliers that are in a provisional state.

Figure 3A:
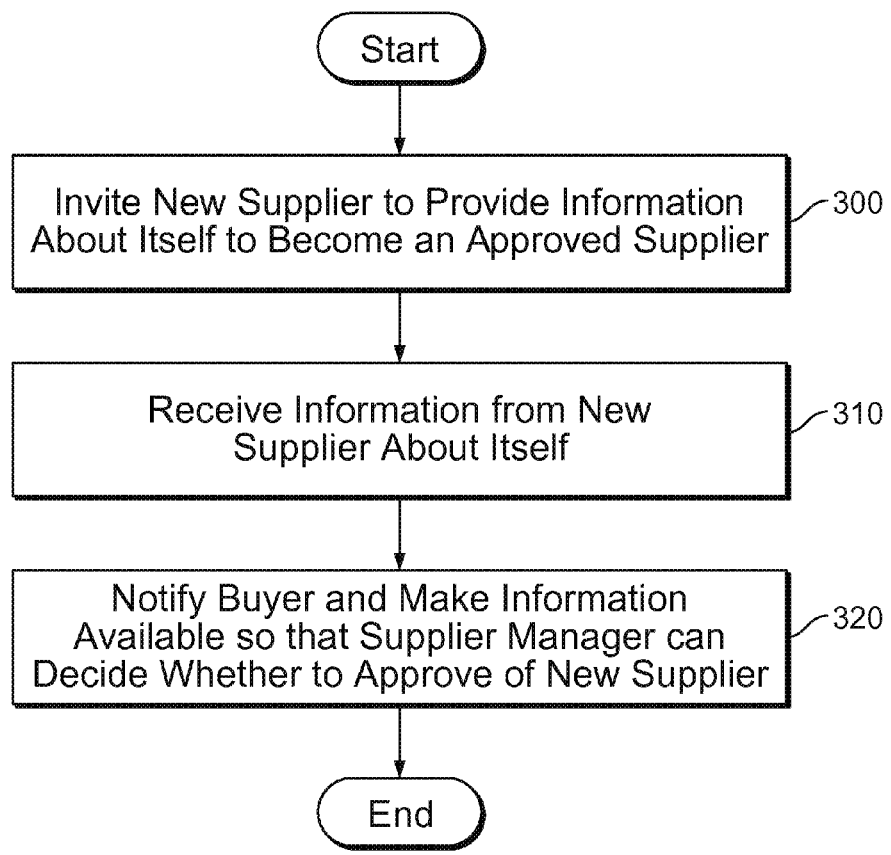
FIG. 3A is a flowchart illustrating an embodiment of a process for supplier activation that uses a supplier network.

FIG. 3A is a flowchart illustrating an embodiment of a process for supplier activation that uses a supplier network. In the example shown, a supplier network collects information associated with a new supplier and makes this information available to a buyer during supplier activation. In some cases, a new supplier being approved has already been approved by another buyer.

At 300, a new supplier is invited to provide information about itself to become an approved supplier. In some cases, there is no pending business event or document associated with a new supplier. For example, a new employee at a buyer may have a preferred supplier from his previous job and may want to have that supplier included in an approved supplier list.

Information from a new supplier about itself is received at 310. In some embodiments, information is collected and stored using a supplier network profile. In some embodiments, a new supplier is already associated with a supplier network and already has a supplier network profile associated with it. In some embodiments, information stored in a supplier network profile or other stored information is presented to a user. For example, a supplier may have already been approved by another buyer that has the same or stricter requirements. A new supplier is not contacted in some embodiments if the supplier network profile already contains the required information. At 320, a buyer is notified and information is made available so that a supplier manager can decide whether to approve of a new supplier. For example, a supplier manager may use a web interface to access stored information that she uses in deciding whether to approve of the supplier. In some embodiment, some other channel or technique is used to access or review information about a new supplier.

In some embodiments, supplier activation is triggered by a requisition or some other event or activity associated with a new supplier. The following figure illustrates an example of organic supplier activation based on a requisition.

Figure 3B:
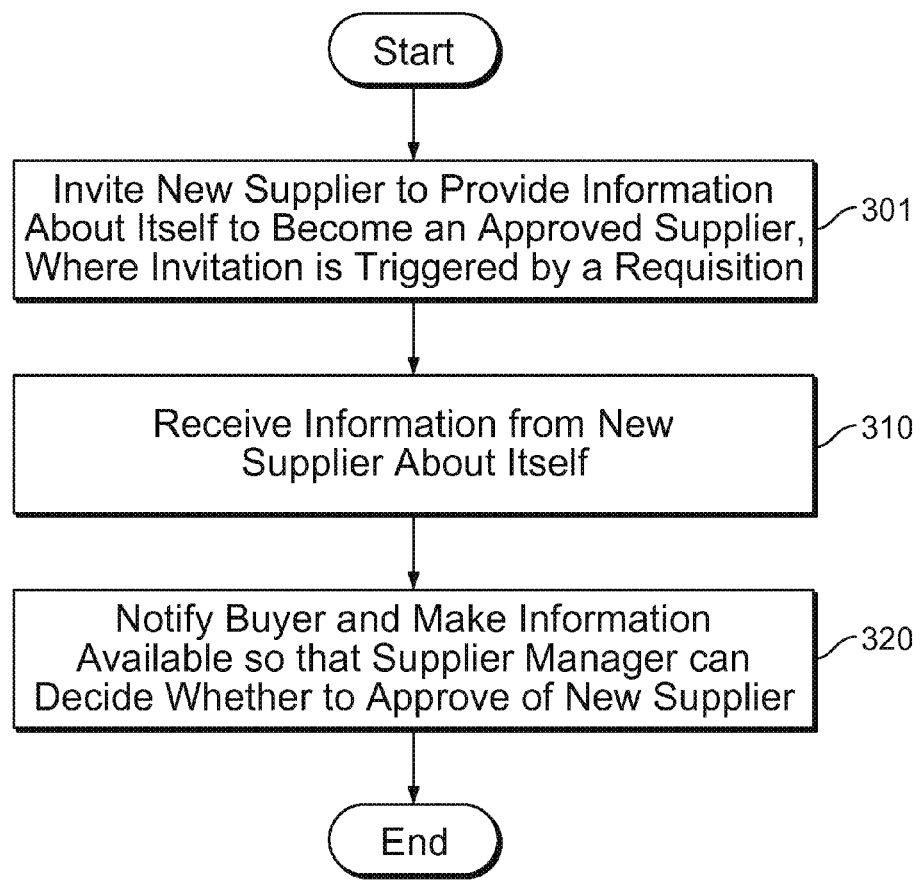
FIG. 3B is a flowchart illustrating an embodiment of a process for organic supplier activation that uses a supplier network.

FIG. 3B is a flowchart illustrating an embodiment of a process for organic supplier activation that uses a supplier network. In the example shown, the process is similar to that of FIG. 3A except at 301. At 301, a new supplier is invited to provide information about itself to become an approved supplier, where the invitation is triggered by a requisition.

In some examples described herein, requisitions are used; in other embodiments some other document, event, or activity (e.g., an RFI, RFP, etc.) is used in organic supplier activation.

In some applications, organic supplier activation is attractive since the new supplier has an incentive to provide requested information quickly. For example, an invitation or some other message passed to a new supplier may indicate that there is a requisition for the new supplier at the buyer. This may motivate a supplier to provide the requested information. In some embodiments, a condition for receiving the requisition (or a related or subsequent document, such as a purchase order) is dependent upon providing requested information.

In some embodiments, processing at a procurement system or at a buyer must wait for supplier activation to be completed. Alternatively, in some embodiments, at least some processing is permitted at a procurement system or a buyer while supplier activation is being performed. The following figure illustrates one example.

Figure 3C:
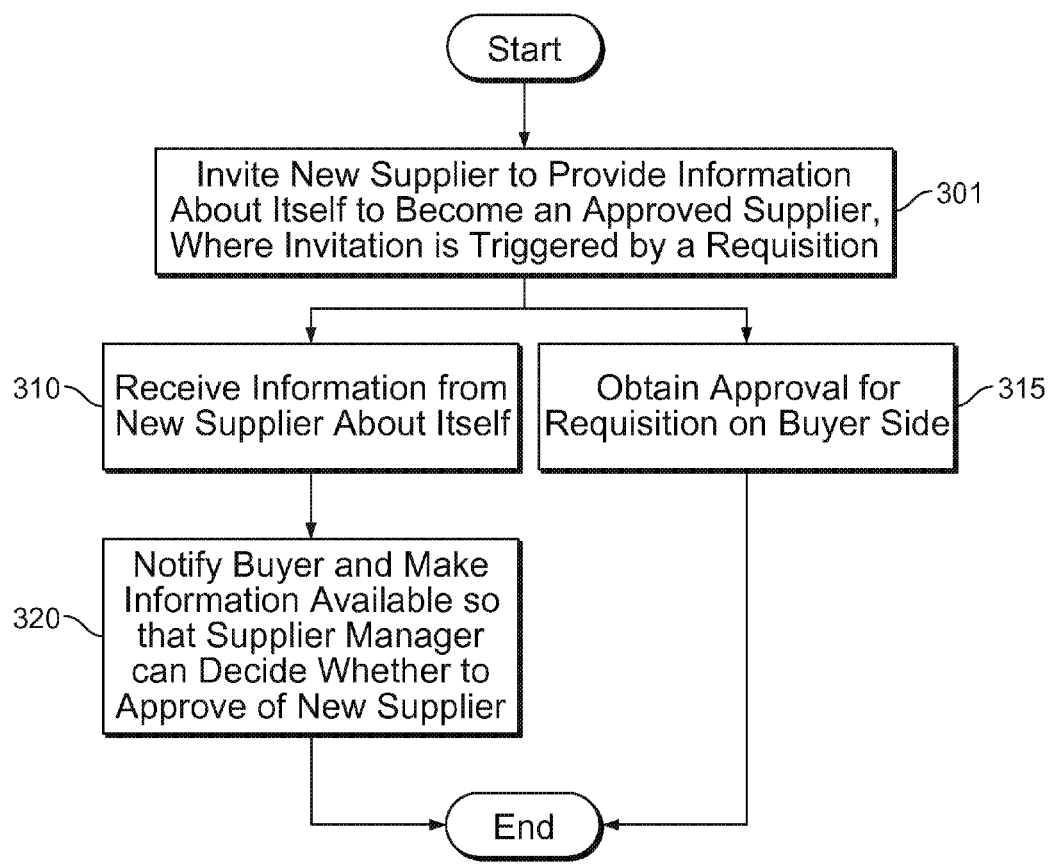
FIG. 3C is a flowchart illustrating an embodiment of organic supplier activation in which a process at a procurement system overlaps with supplier activation.

FIG. 3C is a flowchart illustrating an embodiment of organic supplier activation in which a process at a procurement system overlaps with supplier activation. In the example shown, the process is similar to that of FIG. 3B, except that approval for a requisition is obtained on a buyer side at 315. Step 315 in this example overlaps with receiving information at 310 and/or notifying a buyer and making information available at 320. That is, in this embodiment steps 310 and 320 do not necessarily impede or prevent step 315 from being performed and vice versa. In some embodiments, some other process besides getting approval for a requisition is performed in parallel with supplier activation.

Figure 4:
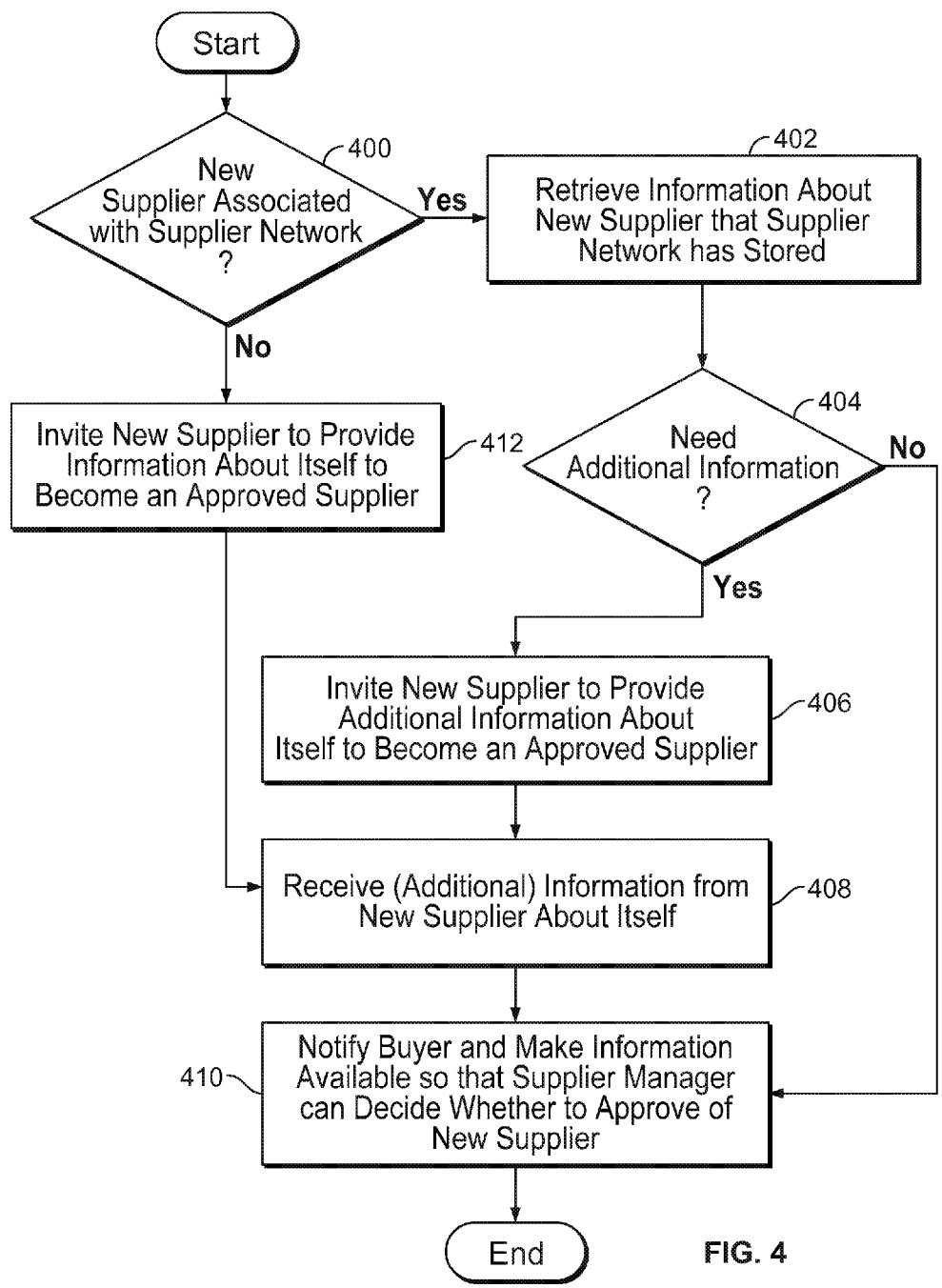
FIG. 4 is a flowchart illustrating an embodiment of a process for obtaining information for a new supplier, where in some cases stored information about a new supplier is used in supplier activation.

FIG. 4 is a flowchart illustrating an embodiment of a process for obtaining information for a new supplier, where in some cases stored information about a new supplier is used in supplier activation. In the example shown, if a new supplier is associated with a supplier network, the supplier network may already have information about the new supplier stored. In some cases (using this embodiment) it may not be necessary to involve a new supplier at all in the supplier activation process, for example if stored information is sufficient for a supplier manager to make a decision. In other cases (using this embodiment), the new supplier is asked to provide some additional information which is not included in the stored information.

At 400 it is determined whether a new supplier is associated with a supplier network. For example, some systems search through supplier profiles or accounts for one associated with the new supplier being approved. In some embodiments, a search is performed based on the company name of a new supplier (e.g., Jane's Flowers). In some embodiments, a search is based on contact information associated with the new supplier (e.g., 100 Main Street, www.janesflowers.com, (650) 555-1234, etc.). In some embodiments, a search is based on information associated with a contact person at the new supplier (e.g., Jane Florist, jane@janesflowers.com, etc.).

In some embodiments, information associated with one or more candidate accounts or profiles are presented to a user at the buyer after a search is performed. For example, if some but not all pieces of contact or identifying information match, in some embodiments a user at the buyer is asked whether a candidate account or profile is associated with a new supplier being approved. In some embodiments, information associated with candidate account(s) or profile(s) is always presented after a search.

If a new supplier is associated with a supplier network, information about the new supplier that a supplier network has stored is retrieved at 402. For example, content or data stored in a supplier network profile is obtained. In some cases, it is not necessary to make the new supplier provide all fields of information used by the buyer. For example, general information such as a mailing address, contact person, or URL of a website for the new supplier may already be stored at a supplier network and this information does not need to be re-supplied.

It is determined at 404 whether additional information is needed. If it is determined additional information is needed, a new supplier is invited to provide additional information about itself to become an approved supplier at 406. In some cases, one buyer has more or different requirements for its suppliers compared to another buyer. In some cases, a buyer is the first buyer to approve of a supplier. At 408, (additional) information is received from the new supplier about itself. At 410, a buyer is notified and information is made available so that a supplier manager can decide whether to approve of the new supplier.

In the event it is determined at 404 that no additional information is needed, steps 406 and 408 are skipped and a buyer is notified and information is made available at 410. For example, a particular supplier may have gone through the approval process many times and a supplier manager may be able to review the stored information without having to involve the new supplier.

If it is determined at 400 that a new supplier is not associated with a supplier network, at 412 a new supplier is invited to provide information about itself to become an approved supplier. In some embodiments, a new supplier network profile (or other object used to collect and store information about a new supplier) is created at a supplier network. At 408, information is received from the new supplier and at 410 the buyer is notified and information is made available to the buyer. In some embodiments, a new supplier provides or fills in fields in a newly created supplier network profile with requested information.

In some cases information is able to be collected in less time and/or the amount of work required by the new supplier is reduced when using this embodiment. In this embodiment, a supplier only needs to provide those pieces of information (if any) that the supplier network does not already have stored. This may be one or two new pieces of information instead of many pieces of information (e.g., that would be required by other systems). In one example, if a supplier is certified in many states, other systems may require a new supplier to re-enter all of its certificates each time it is approved by a buyer. This may take a significant amount of time and/or effort on the part of the supplier. Using the embodiment described above, the example supplier would only need to provide certificates for states that the supplier network has not previously requested and/or has not previously stored.

In some cases, a supplier network may determine that a new supplier is not associated with a supplier network when in actuality it is. In some embodiments, a supplier network is configured so that a new supplier can flag or otherwise indicate that it already has a supplier network profile or has previously provided some information being requested. The following example illustrates one such embodiment.

Figure 5:
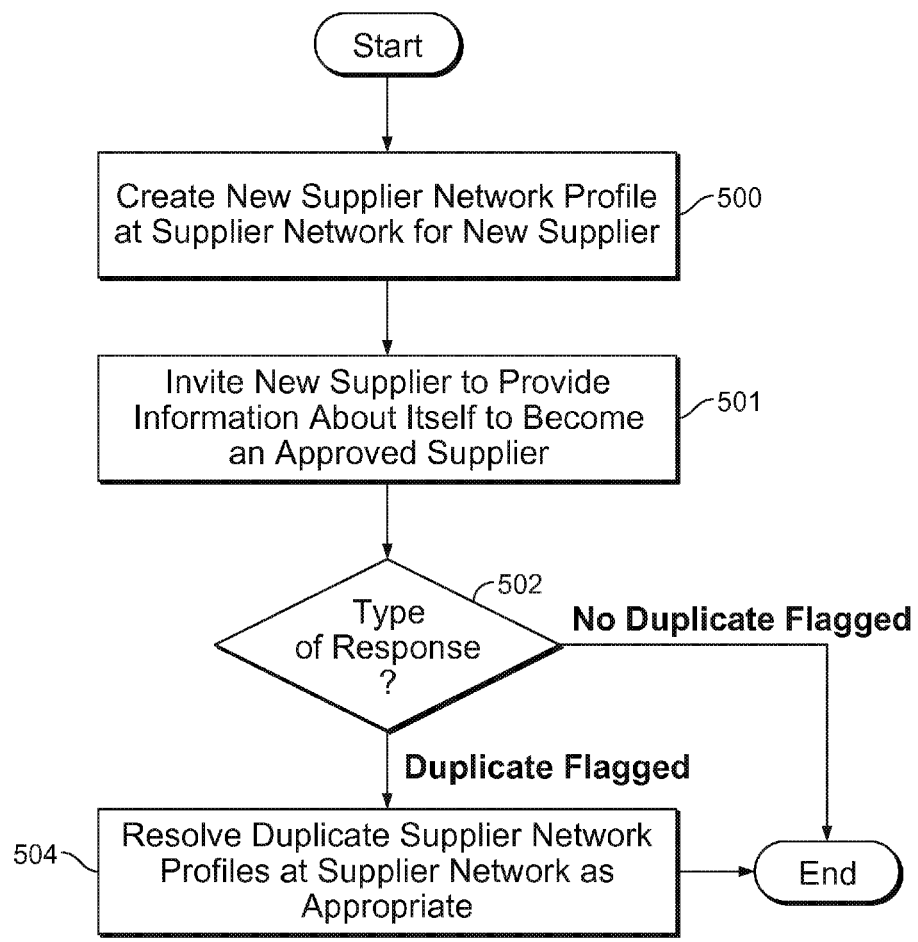
FIG. 5 is a flowchart illustrating an embodiment of a process for resolving duplicate supplier network profiles.

FIG. 5 is a flowchart illustrating an embodiment of a process for resolving duplicate supplier network profiles. In the example shown, a prior process (not shown) has incorrectly determined that a new supplier being approved is not associated with a supplier network. Potentially, a new supplier network profile may be created for a supplier that already has a supplier network profile. In the example shown, a supplier network is configured so that a supplier can flag duplicate network supplier profiles and such duplicates are properly resolved.

At 500, a new supplier network profile is created at supplier network for new supplier. For example, a collection of supplier network profiles may have been searched for one that corresponds to a new supplier being approved; if no existing supplier profiles are found that match a new one may be created. In some cases, a search is inadequate or incorrect information is used in a search and a new supplier network profile is created when it should not be.

At 501, a new supplier is invited to provide information about itself to become an approved supplier. In some embodiments, an invitation that is sent to a new supplier includes a link or reference to the supplier network profile created at 500. In some embodiments, a supplier network profile created at 500 is accessible via a web interface and an invitation includes a URL. In some embodiments, a new supplier is able to detect a duplication because the new supplier is assigned a new profile/account name, is asked to create a new password, is asked to provide information or fill in fields that the supplier has already provided, etc.

In various embodiments, a supplier network system is configured in a variety of ways to enable a user to flag duplications. In some embodiments, a user clicks on a button labeled, "We already have an account." In some embodiments, the user identifies a pre-existing account or profile using an ID number, the company's name, the name of the pre-existing account or profile, etc. In some embodiments, a user is asked to enter a password associated with a pre-existing account or profile, for example as a security feature or to double check that the pre-existing account or profile identified is the correct one. In some embodiments, some other technique is used to flag or indicate duplicate supplier network profiles.

At 502 the type of response is determined. If no duplicate is flagged, the process of resolving duplicates ends. Otherwise, duplicate supplier network profiles are resolved at a supplier network as appropriate at 504. In some embodiments, duplicate supplier network profiles are linked or joined together and both are kept. In some embodiments, the supplier network profile that is created later is deleted, for example after information is copied or moved to the supplier network profile that is created earlier.

In various embodiments, resolving duplicate supplier accounts includes a variety of processes. In some embodiments, some assessment is performed to determine what information is stored in the supplier network profile which was not found in a previous search. In some cases, the information stored in the supplier network profile is sufficient and is presented to and reviewed by a supplier manager associated with the buyer. In some cases, there may be additional pieces of information that a user at a new buyer is asked to provide.

In various embodiments, (additional) information is provided at various times with respect to resolving duplicate supplier accounts. For example, in some systems duplicate supplier accounts are resolved first before a user at a new supplier provides information. In some embodiments, this is performed relatively quickly while a user at a new supplier waits. For example, the user at the new supplier may forget or get busy and it may be better to try to obtain the proper information while the user is logged on or otherwise accessing a supplier network profile.

In some embodiments, some other object or data structure is used to collect, store, and/or organize information about suppliers that are coupled to a supplier network. Techniques appropriate for a particular embodiment may be used to resolve duplicate information or objects.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system for approving a supplier, including:
   one or more interfaces configured to collectively:
      receive a first set of supplier approval criteria associated with a first buyer; and
      receive, from a supplier network, information about the supplier, wherein the received information includes a structured commerce profile for the supplier, and wherein the supplier has already been approved with respect to a second buyer and has been included in a second approved supplier list associated with the second buyer based at least in part on a second set of supplier approval criteria associated with the second buyer, wherein the first set of supplier approval criteria and the second set of approval criteria are different; and
   a processor configured to:
      determine whether to approve the supplier with respect to the first buyer and include the supplier in a first approved supplier list associated with the first buyer based at least in part on the first set of supplier approval criteria and the received information about the supplier.

2. A system as recited in claim 1, wherein the interface includes a web interface.

3. A system as recited in claim 1, wherein the interface is configured to make the received information available by pushing information associated with the supplier.

4. A system as recited in claim 1, wherein the interface is further configured to receive from the buyer an indication to request information from the supplier.

5. A system as recited in claim 1, wherein the interface is further configured to receive from the buyer an indication to request information from the supplier, wherein the indication is triggered by a business event.

6. A system as recited in claim 1, wherein the interface is further configured to receive from the buyer an indication to request information from the supplier, wherein the indication is triggered by a business event, including a requisition.

7. A system as recited in claim 1, wherein:
   the interface is further configured to receive one or more requirements associated with the buyer approving of the supplier; and
   the system further includes a processor configured to determine information to request from the supplier based at least in part on the one or more requirements.

8. A system as recited in claim 1, wherein:
   the interface is further configured to:
      receive one or more requirements associated with the buyer approving of the supplier; and
      receive an update to the one or more requirements; and
   wherein the system further includes a storage controller configured to:
      store the one or more requirements at the supplier network; and
      modify the one or more requirements stored at the supplier network based at least in part on the update.

9. A system as recited in claim 1 further including:
   a processor configured to determine whether the supplier is associated with the supplier network; and
   in the event it is determined that the supplier is associated with the supplier network:
      the processor is further configured to determine additional information to obtain from the supplier that is not stored by the supplier network; and the interface is further configured to request the supplier to provide the additional information.

10. A system as recited in claim 1 further including:
a processor configured to determine whether the supplier is associated with the supplier network; and
in the event it is determined that the supplier is associated with the supplier network:
   the processor is further configured to determine additional information to obtain from the supplier that is not stored by the supplier network; and
   in the event it is determined that there is no additional information to obtain:
      the supplier is not requested to provide any information; and
      all information made available to the buyer is obtained from information stored by the supplier network.

11. A system as recited in claim 1, wherein at least some of the steps are performed at a buyer operated system.

12. A system as recited in claim 1, wherein the interface is further configured to receive at least one of a duplicate profile associated with the supplier and a pre-existing profile associated with the supplier.

13. A system as recited in claim 1, wherein the supplier network includes a listing of potential suppliers.

14. A system as recited in claim 1, wherein the buyer operated application and the supplier network are administered by the same entity and may be combined as part of a single multi-tenant infrastructure.

15. A system as recited in claim 1, wherein the buyer operated application is associated with procurement.

16. A system as recited in claim 1, wherein the buyer operated application is associated with sourcing.

17. A system as recited in claim 1, wherein the structured commerce profile includes at least one attribute and at least one associated value.

18. A system as recited in claim 1, wherein the decision is made automatically based on a specified set of conditions.

19. A method for approving of a supplier, including:
receiving, via an interface, a first set of supplier approval criteria associated with a first buyer;
receiving, from a supplier network, information about the supplier, wherein the received information includes a structured commerce profile for the supplier, and wherein the supplier has already been approved with respect to a second buyer and has been included in a second approved supplier list associated with the second buyer based at least in part on a second set of supplier approval criteria associated with the second buyer, wherein the first set of supplier approval criteria and the second set of approval criteria are different; and
determining, by a processor, whether to approve the supplier with respect to the first buyer and include the supplier in a first approved supplier list associated with the first buyer based at least in part on the first set of supplier approval criteria and the received information about the supplier.

20. A computer program product for approving of a supplier, the computer program product being embodied in a computer readable medium and comprising computer instructions for:
receiving, via an interface, a first set of supplier approval criteria associated with a first buyer;
receiving, from a supplier network, information about the supplier, wherein the received information includes a structured commerce profile for the supplier, and wherein the supplier has already been approved with respect to a second buyer and has been included in a second approved supplier list associated with the second buyer based at least in part on a second set of supplier approval criteria associated with the second buyer, wherein the first set of supplier approval criteria and the second set of approval criteria are different; and
determining whether to approve the supplier with respect to the first buyer and include the supplier in a first approved supplier list associated with the first buyer based at least in part on the first set of supplier approval criteria and the received information about the supplier.

* * * * *